United States Patent [19]
Katz et al.

[11] 3,966,979
[45] June 29, 1976

[54] PROCESS FOR FREEZING COFFEE EXTRACT

[75] Inventors: Saul N. Katz, Monsey, N.Y.; Daniel E. Dwyer, Jr., Long Valley, N.J.

[73] Assignee: General Foods Corporation, White Plains, N.Y.

[22] Filed: May 21, 1975

[21] Appl. No.: 579,535

[52] U.S. Cl. .................................. 426/385; 34/5; 62/74; 62/320; 62/345; 426/594
[51] Int. Cl.² ....................... A23F 1/04; A23C 1/06
[58] Field of Search .......... 426/384, 385, 594, 444; 34/5; 62/58, 66, 74, 72, 340, 345, 346, 347, 320, 380

[56] References Cited
UNITED STATES PATENTS

| | | | |
|---|---|---|---|
| 3,024,117 | 3/1962 | Barlow | 62/58 X |
| 3,218,731 | 11/1965 | Stinchfield | 62/345 X |
| 3,244,529 | 4/1966 | Johnson et al. | 34/5 X |
| 3,253,420 | 5/1966 | De George | 426/524 X |
| 3,462,281 | 8/1969 | Macy, Jr. | 426/385 |
| 3,809,766 | 5/1974 | Stolz | 426/594 |

FOREIGN PATENTS OR APPLICATIONS

| | | | |
|---|---|---|---|
| 1,906,924 | 2/1968 | Germany | 426/384 |

*Primary Examiner*—Frank W. Lutter
*Assistant Examiner*—N. Greenblum
*Attorney, Agent, or Firm*—Richard Kornutik

[57] ABSTRACT

This invention involves applying a warm coffee extract onto a freezing surface in a plurality of layers until a desired thickness is obtained. Thus applied, there is continual melting and refreezing of the extract. This permits the formation of large ice crystals whereby the finished product is darker and more coffee-like in color. Overall efficiency of the freezing process is also increased allowing higher productivity rates.

10 Claims, No Drawings

PROCESS FOR FREEZING COFFEE EXTRACT

BACKGROUND OF THE INVENTION

The growing demand for freeze-dried products has led to ever increasing demands for more efficient means of performing all of the operations necessary to obtain a freeze-dried product. A critical step in the process is the actual freezing of the product to be dried. Generally, it is recognized that rapid freezing will promote the growth of a large number of well-ordered dendritic ice crystals of small size and that slow freezing will produce a lesser number of non-ordered dendritic ice crystals of a larger size. Thus, in the dehydration of solid foods, the cellular structure of the food can be modified by varying the freezing rate. Since liquid food material, such as coffee extract, lacks the cellular structure of solid foods, various methods have been advanced to promote the formation of dendritic ice crystals during the freezing process of the extract. Large non-ordered dendritic ice structures, when sublimed, permit a product which is darker and more coffee-like in color than a product based on the smaller structures.

One method is dynamic freezing of the extract. Here the extract is agitated or vibrated to prevent supercooling and spontaneous nucleation. Heat removal from the extract is thus more uniform. Another method is static freezing in which no overt agitation is used and the liquid material is slowly frozen by contact with a cooling surface which allows slow heat removal from the body of the extract. Still another method is to seed the extract with previously formed ice crystals. These methods, however, have inherent disadvantages or limitations. Agitation is only feasible during the early stages of chilldown while the extract is still liquid. Likewise, seeding techniques are performed while the extract is still in a liquid state. In static freezing, the time needed to permit the growth of large dendritic ice crystals necessarily limits the overall product output rate.

The freezing of coffee extract in preparation for freeze-drying is commonly done on a continuous stainless steel or teflon coated belt. Liquid slushed or foamed extract is normally fed onto one end of the belt by a pipe or spreader device. Additional means such as a dam or partitions may be employed to insure that the extract uniformly covers the width of the belt. Freezing or heat removal is by conduction through the belt, such as by continually spraying the underside of the belt freezing surface with brine. Commonly, a series of brine tanks are maintained at progressively lower temperatures from the beginning of the belt to the end. A typical temperature range is from about plus 10°F to minus 40°F or below. The temperature profile across the length of the belt is dependent on the freezing rate characteristics desired. The freezing rate for coffee extract is a major factor in the final product's color. Maintaining all of the brine at its lowest possible temperature results in a very high freezing rate. However, such high freezing rates produce a product which is light brown or tan in color. As the freezing rate is slowed, a darker, more desirable product is obtained. However, this slow freezing by temperature profiling limits productivity.

The extract applied to the belt, as above described, spreads out as a relatively uniform layer and is frozen into a solid slab, usually about ¼ to 1 inch in thickness. Various methods of freezing the coffee extract, all of which require an extended period of time, are illustrated in U.S. Pat. Nos. 3,253,420 to DeGeorge, 3,399,061 to Lutz, 3,443,963 to Simon et al., and 3,809,766 to Stolz.

It would, therefore, be highly desirable if the simple method would be devised for freezing coffee extract at a relatively high rate, while at the same time, promoting the growth of large ice crystals whereby the finished product is dark and coffee-like in color.

As used in this application, "Extract" means an aqueous extract of coffee solids having a concentration of between 15 and 50 percent soluble solids by weight. "Icepoint" is that temperature at which water in the extract begins to crystallize into water ice. "Eutectic point" means that temperature at which the specific mixture of coffee solids volatile aromatics and water having the lowest melting point of any other mixture in the extracts solidifies. In effect, this temperature is the lowest possible melting point of any material contained in the extract. "Product temperature" as used herein means the temperature of the dried coffee extract. "Freeze-drying" as used in this context refers to the process of drying whereby water is removed directly from the solid state to the vapor state without passing through an intermediate liquid state (sublimination). This process also includes that portion of the drying process wherein all the water ice crystals have been sublimed and a eutectic mixture of coffee solids aromatics and water is dried to a stable moisture content. In this portion of the freeze-drying process, it is possible that some evaporation of water from the liquid state may occur without appreciable melting of the frozen extract. However, even at this stage of the drying, the product temperature should be kept below the eutectic point of the material being dried in order to avoid melting any portion of the frozen coffee extract.

SUMMARY OF THE INVENTION

This invention is directed to a process for producing a dark color, freeze-dried coffee at a high freezing rate. First, a liquid coffee extract is obtained. This extract is then applied onto a freezing surface which is sufficiently chilled to fast freeze the extract as it contacts the freezing surface. As the extract continues to be applied, it contacts the previously fast frozen extract layer and constantly remelts the upper portion of that extract layer until a desired slab thickness is obtained. This constant remelting allows the formation of large non-ordered dendritic ice crystals. Further, the melting and refreezing of each new layer of extract requires no initial energy removal as compared to conventional freezing and produces a darker final product and a higher belt capacity. The resultant slab is comminuted such as by grinding and then freeze-dried to a stable moisture content.

DETAILED DESCRIPTION OF THE INVENTION

According to the process of this invention, a coffee extract is first obtained. The extract is held at a temperature between about 32°F to about 85°F. The freezing surface to be used is a continuous stainless steel belt. Underneath the freezing surface of the belt is a brine system. The brine is continually sprayed against the belt. It is preferred that the temperature of the brine, and thus, the entire freezing surface of the belt be maintained at the lowest possible temperature permitted by the brine system. This is typically about minus 30°F. It is, however, contemplated that the brine temperature can be varied along the length of the belt.

Located above the belt is a means for applying the extract evenly to the belt. One application means contemplated by this invention is to use a series of dams spaced along the length of the belt. The preferred method employed is a series of spray nozzles along almost the entire length of the belt. In this embodiment, extract is continually sprayed onto the moving belt at a rate such that a slab of frozen extract between about ¼ to 1 inch thick is obtained at the end of the belt. No extract is sprayed onto the belt along approximately the last 20 percent of its freezing surface. This is to insure that the product exiting the belt is completely frozen. It will be apparent to anyone with an ordinary skill in the art that various combinations of extract temperature, spray rates, and belt's speed are contemplated.

As the first extract contacts the beginning of the moving belt, it forms a fast frozen layer. However, as the belt progresses, additional warm extract is continuously applied. Thus, as the warm extract contacts each previous layer of extract, the upper portion of that layer is constantly remelted. This remelting permits the growth of large dendritic ice crystals. The most critical period for ice crystal growth is during the initial freezing. What must be avoided is supercooling and its resultant spontaneous nucleation. The ideal environment for the desired crystal growth occurs in a narrow temperature between the ice point and the eutectic point of the extract. This range varies slightly depending on the soluble solids concentration of the extract and is usually between about 22°F to about 28°F. Using the warm extract itself to constantly remelt the product permits the product to remain in the critical temperature range for a relatively long period of time.

Another advantage of this invention is that capacity is increased on the order of about 20 to about 50 percent over the conventional method of applying the extract to only one end of the belt and, thus, initially forming a liquid bed. According to the present invention, as the extract travels down the belt, the lower layers of the extract bed become fast frozen. Since frozen coffee extract has a much higher thermal conductivity rate than liquid extract, the total efficiency of the system is thus increased.

This invention is further described but not limited by the following example:

EXAMPLE

The freezing surface used is a continuous stainless steel belt. The belt is about 2 feet wide and is operated by 2 pulleys located about 50 feet apart. The belt is cooled by contact with the plurality of cold brine tanks located on the underside of the freezing surface of the belt. All tanks are maintained at minus 30°F. Directly above the belt are located 22 spray nozzles so positioned that when coffee extract is passed through them, they provide a continuous, even spray along about 40 feet of the freezing surface of the belt.

Coffee extract at 26 percent soluble solids by weight and the temperature of 52°F is passed through the spray nozzles onto the moving belt at a rate that results in a final slab thickness of 0.5 inches. The completely frozen coffee slab is then ground to below 8 mesh (U.S. Standard Screen) and dried in a commercial freeze-drying unit in a vacuum of below 500 microns. The resulting coffee product appears dark brown in color.

The foregoing explanation and example were for illustrative purposes only, and the scope of the invention is intended to be limited only by the appended claims.

What is claimed is:
1. A process for producing a dark colored freeze-dried coffee which comprises:
   a. producing a liquid coffee extract,
   b. continuously applying layers of said extract to a freezing surface which is sufficiently chilled to fast freeze the extract such that as the extract continues to be applied it contacts each previously frozen layer of extract and constantly remelts the upper portion of that layer,
   c. completely freezing the extract,
   d. comminuting the frozen extract, and
   e. freeze-drying the frozen comminuted extract to a stable moisture content.
2. The process of claim 1 wherein the freezing surface is a moving belt.
3. The process of claim 2 wherein the extract is sprayed onto the freezing surface.
4. The process of claim 3 wherein a plurality of spraying means are so positioned that they provide a continuous overlapping spray.
5. The process of claim 4 wherein a portion of the freezing surface at the discharge end of the belt is not subjected to the extract spray.
6. The process of claim 5 wherein the extract is between the concentration of about 15 to about 50 percent soluble solids by weight.
7. The process of claim 6 wherein the temperature of the extract is between about 32°F to about 85°F.
8. The process of claim 7 wherein the chilling surface is maintained at between about +10°F to about −40°F.
9. The process of claim 8 wherein the chilling surface is maintained at about −30°F.
10. The process of claim 9 wherein the thickness of the frozen extract exiting the belt is between about 0.25 inches to about 1.0 inches.

* * * * *

UNITED STATES PATENT AND TRADEMARK OFFICE
CERTIFICATE OF CORRECTION

PATENT NO. : 3,966,979

DATED : June 29, 1976

INVENTOR(S) : Saul N. Katz et al.

It is certified that error appears in the above-identified patent and that said Letters Patent are hereby corrected as shown below:

In column 3, line 29, before "between" insert -- range --.

Signed and Sealed this

Twelfth Day of April 1977

[SEAL]

Attest:

RUTH C. MASON
*Attesting Officer*

C. MARSHALL DANN
*Commissioner of Patents and Trademarks*